United States Patent [19]
Raets

[11] Patent Number: 6,072,709
[45] Date of Patent: Jun. 6, 2000

[54] MULTIPLE OUTPUT VOLTAGE CONVERTER WITH IMPROVED CROSS-REGULATION

[75] Inventor: Hubert Raets, Landgraaf, Netherlands

[73] Assignee: U.S. Philips Corporation, New York, N.Y.

[21] Appl. No.: 09/205,974

[22] Filed: Dec. 4, 1998

[30] Foreign Application Priority Data

Dec. 10, 1997 [DE] Germany .......................... 197 54 846

[51] Int. Cl.[7] .................................................. H02M 5/42
[52] U.S. Cl. .............................................. 363/93; 307/28
[58] Field of Search ........................... 363/93, 16; 307/28

[56] References Cited

U.S. PATENT DOCUMENTS 5,737,203  4/1998  Barrett ...................................... 363/75

FOREIGN PATENT DOCUMENTS

195 29 941  2/1997  Germany .

*Primary Examiner*—Shawn Riley
*Attorney, Agent, or Firm*—Bernard Franzblau

[57] ABSTRACT

A voltage converter for converting an input voltage into at least a first high output voltage and a second lower output voltage. An input resonant circuit includes a transformer primary winding. At least first and second output circuits, each of which includes a respective secondary winding or a part of a secondary winding of the transformer and which supply the first and second output voltages. The second output circuit includes a rectifier arrangement supplying a DC output voltage. To improve the synchronism of the output voltages, i.e. reduce the cross-regulation, an additional capacitance is connected parallel to the secondary winding of the second output circuit and is dimensioned such that its capacitance, transformed to the primary winding essentially corresponds to the capacitance, transformed to the primary winding, of a parallel capacitance of the secondary winding of the first output circuit. Alternatively, a subsidiary circuit can be added to the second output circuit comprising an additional transformer secondary winding with an additional capacitor and an additional rectifier arrangement in a series circuit arranged parallel to a branch of the rectifier arrangement and to a load connected thereto.

20 Claims, 6 Drawing Sheets

MULTIPLE OUTPUT VOLTAGE CONVERTER WITH IMPROVED CROSS-REGULATION

BACKGROUND OF THE INVENTION

This invention relates to a voltage converter for converting an input voltage into at least two output voltages, comprising an input resonant circuit which includes a primary winding of a transformer and to which the input voltage can be applied in periodically recurrent time intervals, at least two output circuits, each of which includes a secondary winding or a part of a secondary winding of the transformer and from which one of the output voltages can be derived, a first one of the output voltages supplied by a first one of the output circuits constituting a high voltage and the other output voltage(s) constituting (a) voltage(s) which is (are) lower with respect to said high voltage, at least (one of) the other output circuit(s) supplying the other output voltage(s) comprising a rectifier arrangement for supplying a DC voltage as output voltage.

A voltage converter for converting an AC input voltage into a high DC voltage as well as further DC power supply voltages is known from German Offenlegungsschrift DE 195 29 941 A1. In this converter, the AC voltage applied to the input of the converter is applied to a rectifier arrangement whose output signal is applied to two series-arranged electronic switches. A series circuit of a capacitance, an inductance and a primary winding of a transformer is arranged in parallel with one of the electronic switches. A secondary winding of the transformer is arranged subsequent to the capacitance at the output. A control circuit is provided which controls the switching frequency of the electronic switches in such a way that there is a DC voltage drop of the desired value across the capacitance at the output. The transformer is provided with additional taps at the secondary side, from which the further DC power supply voltages can be derived via circuit arrangements for voltage stabilization.

If the first mentioned output in such a voltage converter is a high-voltage output which supplies a significantly higher DC output voltage as compared with the AC voltage applied to the input or as compared with the DC voltage derived therefrom by the rectifier arrangement and applied to the electronic switches, and if the further DC power supply voltages are implemented as low-voltage outputs, the capacitance at the output, which forms a parallel capacitance of the high-voltage output of the voltage converter, will decisively determine the operating behavior of this voltage converter due to the then selected higher transformation ratio between the primary winding and the secondary winding of the transformer, because this capacitance is transformed to a proportionally high value at exactly this high transformation ratio at the primary side of the transformer. On the other hand, parallel capacitances dimensioned in a comparable manner at the additional taps at the secondary side, constituting low-voltage outputs of the voltage converter for the comparably low further DC power supply voltages, have only a small influence at the primary side of the transformer because they are only transformed accordingly with the lower transformation ratios at the primary side.

It has been found that the parallel capacitance of the high-voltage output in a conventional implementation of such a voltage converter exerts a significant, predominant influence on the primary side of the transformer even when it is not constituted by an additional component but only by the parasitic winding capacitance of the secondary winding.

In contrast, the effect of parasitic winding capacitances from the secondary windings or the parts of the secondary winding connected to the taps for the further DC power supply voltages are negligibly small when transformed to the primary side of the transformer.

In the case of loads on the different secondary windings and taps, i.e. when electric power is derived via the high voltage or the further DC power supply voltages, there is a mutual influence in a voltage converter of the type described in the opening paragraph, which mutual influence is referred to as cross-regulation and becomes manifest in that the output voltages, i.e. the high voltage and the further DC power supply voltages are not only dependent on their mutual ratio of turns of the secondary windings or parts of the secondary winding but also on their respective loads. This means that, in spite of regulating one of the DC voltages at a fixed value, fluctuations occur in the other DC voltages which are dependent on the loads of the outputs.

It may be attempted to limit these fluctuations by maximally reducing the leakage inductances of the secondary windings or the parts of the secondary winding of the transformer. However, this solution is subject to limits, particularly because of the design of the core and the bobbin of the transformer, the requirement of mutual voltage insulation of the individual windings of the transformer and the minimum number of turns of the separate windings which, inter alia, is determined by the maximally admissible magnetic induction in the core. In practice, this has the result that, for given uses of the voltage converter described and the implementation of the transformer required for these uses, the requirements simultaneously imposed on a synchronous operation of the voltages supplied at the secondary side cannot be met. This means that the cross-regulation in such voltage converters cannot be kept within the prescribed limits so that the voltage converter of the type described is not usable for said application.

Figure 1:
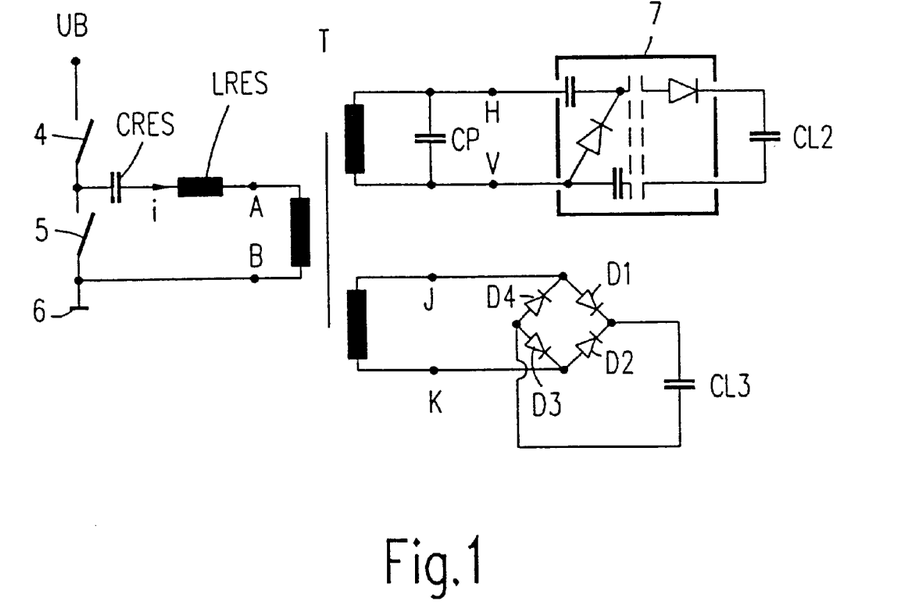
FIGS. 1–6 are circuit diagrams of voltage converters and elements therein.

For the purpose of elucidation, FIG. 1 shows the problem of cross-regulation of a voltage converter for converting an input voltage UB into a high DC voltage and a further power supply voltage. This voltage converter comprises two series-arranged switches 4, 5 which are alternately periodically conducting and non-conducting as choppers between the input voltage UB and ground 6. The series arrangement of a resonant capacitance CRES, a resonant inductance LRES and the primary winding of a transformer T between junction points A and B is connected parallel to the second one of these switches, denoted by the reference numeral 5. The resonant capacitance CRES and the resonant inductance LRES are elements of an input resonant circuit of the voltage converter, which also includes the primary winding of the transformer T.

The transformer T has two secondary windings, a first of which is connected to junction points H and V and a second is connected to junction points J and K. The transformer T is dimensioned so that the junction points H and V supply an AC voltage of a high amplitude and the junction points J and K supply a further AC voltage. The first secondary winding between the junction points H and V is therefore also referred to as a high-voltage winding. The further AC voltage at the second secondary winding between the junction points J and K has an essentially lower amplitude; in contrast to the AC voltage of a high amplitude (high voltage) at the first secondary winding, it will hereinafter be referred to as the low voltage.

Each secondary winding of the transformer T is included in an output circuit. The first output circuit, which includes the first secondary winding between the junction points H and V, is implemented for supplying the high DC voltage, and the second output circuit, which includes the second secondary winding between the junction points J and K, is implemented for supplying the further power supply voltage. In the voltage converter shown in FIG. 1, the first output circuit comprises a voltage multiplier 7 whose output is connected to a load capacitance CL2 at which the high DC voltage is available during operation. A parallel capacitance CP which, dependent on the implementation of the voltage converter, may be constituted by the parasitic winding capacitance of the first secondary winding of the transformer T in the first output circuit or by a separate component, is inserted between the junction points H and V.

The output circuit of the voltage converter of FIG. 1, including the second secondary winding, comprises a bridge rectifier with four diodes D1, D2, D3 and D4. The output of this bridge rectifier is connected to a load capacitance CL3 at which the further power supply voltage is available during operation.

In FIG. 1, no capacitance is inserted between the junction points J and K. Due to the choice of the transformation ratio between the second secondary winding between the junction points J and K and the primary winding between the junction points A and B, on the one hand, and the transformation ratio between the first secondary winding between the junction points H and V and the primary winding, on the other hand, the influence of a parasitic winding capacitance of the second secondary winding, transformed to the primary side of the transformer T, is negligible as compared with the parallel capacitance CP in this voltage converter.

Figure 2:
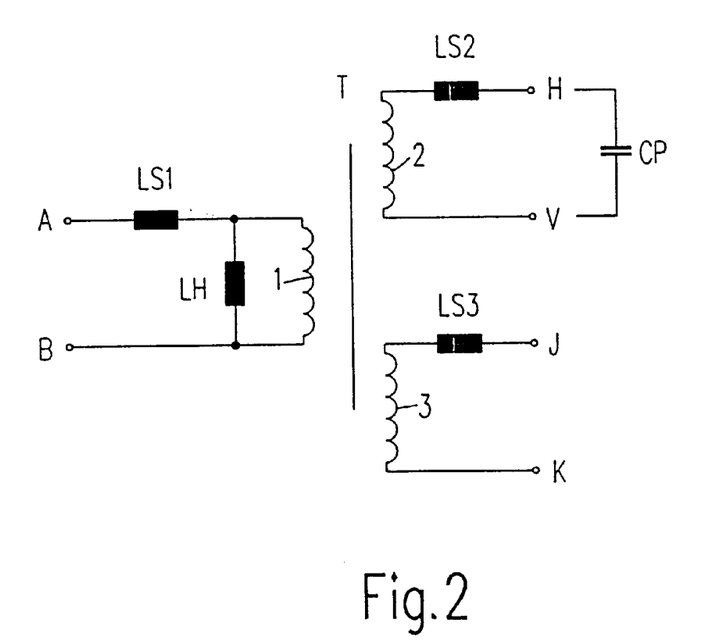

To explain the operation of the voltage converter of FIG. 1, FIG. 2 shows an equivalent circuit diagram of the transformer T. It comprises, between the junction points A and B as an equivalent circuit diagram for the primary winding, a series arrangement of a primary leakage inductance LS1 with a parallel arrangement of a principal inductance LH of the transformer T and a primary winding 1 of an ideal transformer. At the secondary side, the equivalent circuit diagram of FIG. 2 comprises, for the first secondary winding, the winding 2 of the ideal transformer in series with a leakage inductance LS2 at the secondary side between the junction points H and V, and a series arrangement of a further secondary winding 3 of the ideal transformer with the associated leakage inductance LS3 at the secondary side between the junction points J and K. The values for the leakage inductances can be unambiguously determined from the technical data of the transformer T to be used. The equivalent circuit diagram of FIG. 2 further shows the parallel capacitance CP for the first secondary winding 2 between the junction points H and V.

Figure 3:
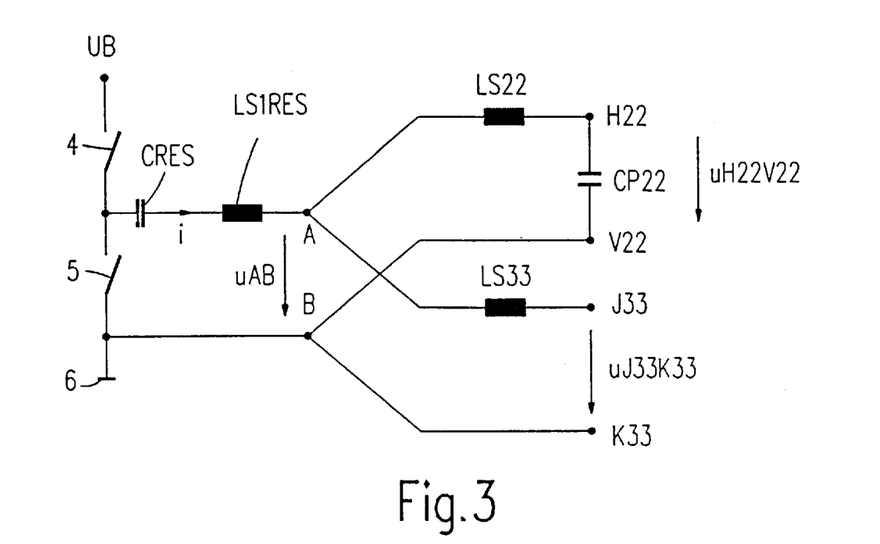

To elucidate the problem of cross-regulation, FIG. 3 is a further simplification of the equivalent circuit diagram of the transformer T, together with the most important other elements of the voltage converter of FIG. 1. The equivalent circuit diagram is simplified in that the elements of the transformer T at the secondary side are transformed with the associated transformation ratios to the primary side of the transformer T so that a simplified, DC-coupled equivalent circuit diagram is obtained. In this circuit diagram, elements already described have the same reference symbols. The reference LS22 denotes the leakage inductance LS2 at the secondary side, transformed to the primary side. Similarly, the reference LS33 denotes the leakage inductance LS3 at the secondary side, transformed to the primary side of the transformer T. The reference CP22 denotes the parallel capacitance CP in its form transformed to the primary side of the transformer T. Similarly, the references H22, V22, J33 and K33 denote the junction points of the transformed circuit corresponding to the junction points H, V, J and K, respectively. During operation of the voltage converter of FIG. 1, the voltage uAB is obtained between the junction points A and B for the equivalent circuit diagram of FIG. 3, the voltage uH22V22 is obtained between the junction points H22 and V22, and the voltage uJ33K33 is obtained between the junction points J33 and K33. The primary circuit of the voltage converter, i.e. the input resonant circuit with the primary winding of the transformer T, is further simplified in FIG. 3. The leakage inductance LS1 is combined with the resonant inductance LRES to a resultant resonant inductance LS1RES. As, in contrast, the principal inductance LH can usually be considered as being high-ohmic, it is not shown in FIG. 3. In operation, a current i flows in the input resonant circuit.

Figure 4:
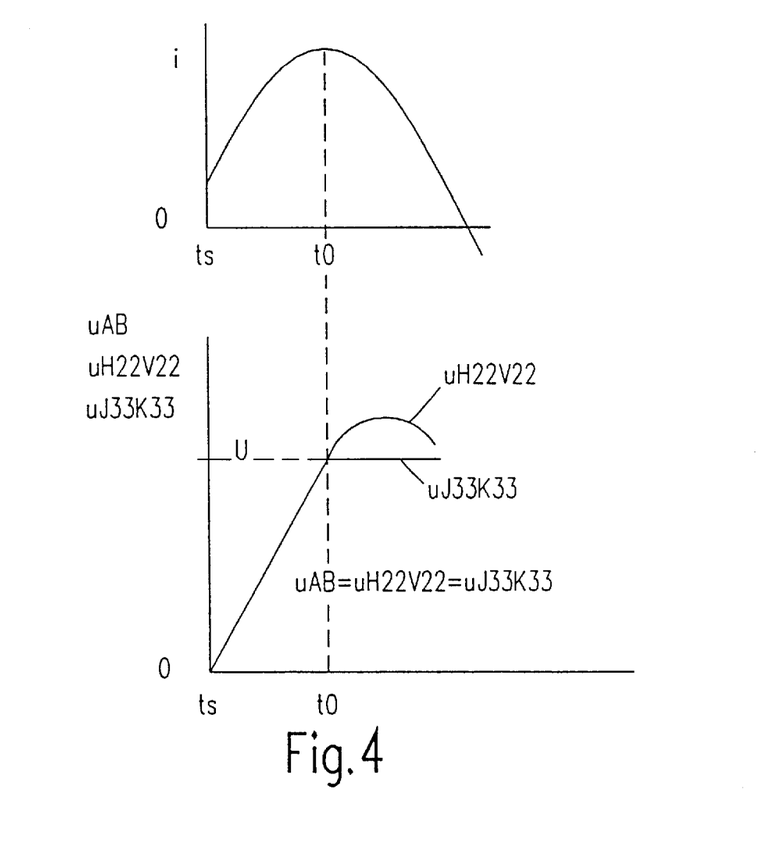

FIG. 4 shows the voltages in the equivalent circuit diagram of FIG. 3 for operation of the voltage converter of FIG. 1, and the current i in the input resonant circuit. The start is an instant ts when the transformed parallel capacitance CP22 is completely discharged. Similarly, the voltage uH22V22 at the instant ts is zero. At a proportionally small transformed leakage inductance LS22 and a slow variation of the current i, the voltage produced at the transformed leakage inductance LS22 may initially be ignored. In a first approximation, the voltage uAB in this operating condition thus corresponds to the voltage uH22V22. Both rise, starting from zero at the instant ts. In this operating condition, the bridge rectifier D1, D2, D3, D4 is still blocked, while no current flows in the second output circuit via the junction points J33, K33, and the voltage uJ33K33 directly follows the variation with respect to time of the voltage uAB. The current i completely flows in the parallel capacitance CP22 and charges this capacitance.

The operating condition described above changes at the instant t0 when the parallel capacitance CP22 is charged to such an extent that the voltage uAB and hence the voltage uJ33K33 reach a value U which represents the further DC power supply voltage at which the load capacitance CL3 is charged during operation, transformed to the primary side of the transformer T. At the instant t0, the bridge rectifier D1, D2, D3, D4 thus becomes conducting and the voltage uJ33K33 maintains the value U. The equivalent circuit diagram for this state of operation is shown in FIG. 5 in which elements already explained have the same reference symbols.

Figure 5:
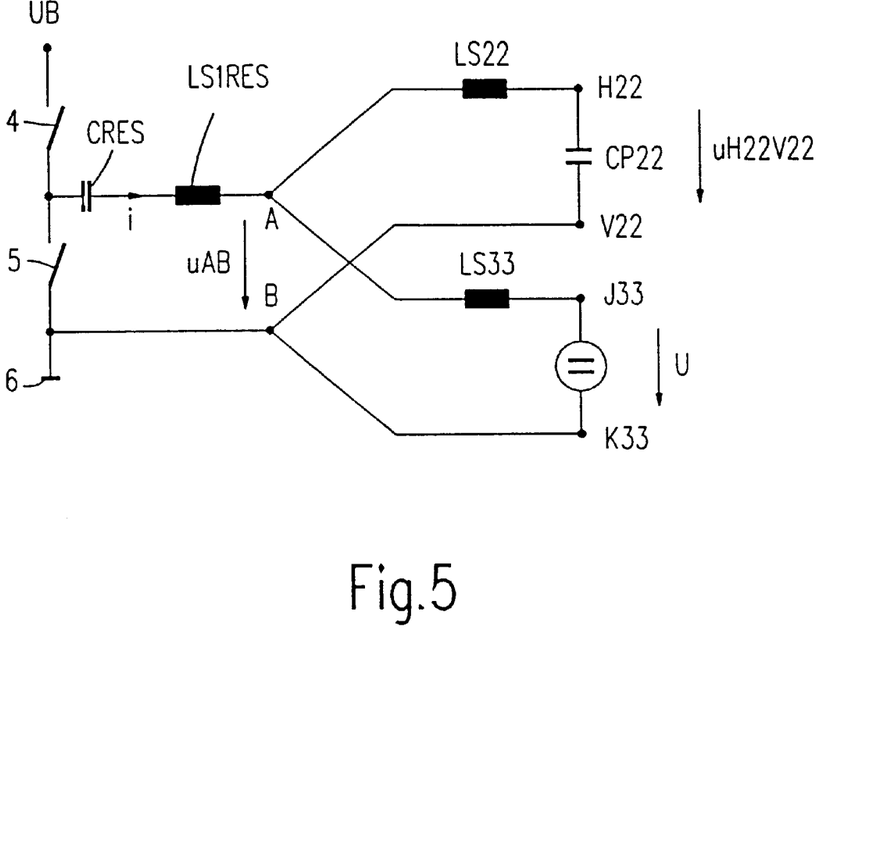

If the voltage produced at the transformed leakage inductance LS33 is also ignored in the equivalent circuit diagram of FIG. 5, the voltage uAB maintains the value U from the instant t0. In a voltage converter without the cross-regulation effect, the voltage uH22V22 would also maintain the value U from the instant t0. However, also after the instant t0, the voltage at the (transformed) parallel capacitance CP22 further rises. This variation is shown in FIG. 4.

Figure 6:
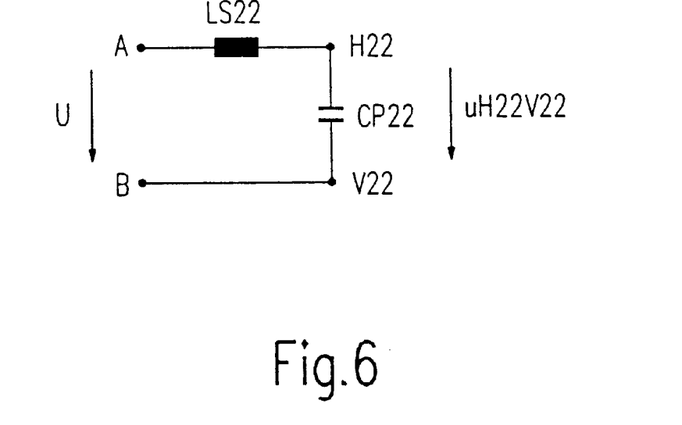

To explain the rise of the voltage uH22V22, FIG. 6 shows a section of the equivalent circuit diagram of FIG. 3, in which the elements already described again have tile same reference symbols. The section shown in FIG. 6 comprises the transformed leakage inductance LS22 at the secondary side and the transformed parallel capacitance CP22. It is shown that these elements in the operating situation described constitute a series circuit of an inductance and a capacitance to which a voltage jump corresponding to the voltage U is applied at the instant t0. The voltage which is formed at the parallel capacitance CP22, transformed to the primary side, has a sinusoidal variation whose amplitude is proportional to the value of the current i in the input resonant circuit at the instant t0 and inversely proportional to the value of the transformed parallel capacitance CP22. Moreover, this amplitude is inversely proportional to the duration of the sinusoidal voltage variation which is again determined from the reciprocal value of the square root of the product of the transformed parallel capacitance CP22 and the transformed leakage inductance LS22. The voltage overshoot, i.e. the amplitude of the sinusoidal variation of the voltage uH22V22 after the instant t0, as shown in FIG. 4, is thus proportional to the current i in the input resonant circuit and hence, in accordance with the equivalent circuit diagram of FIG. 3 in the transformed, secondary leakage inductance LS22 at the instant t0 and proportional to the square root of this transformed leakage inductance LS22 and inversely proportional to the square root of the transformed parallel capacitance CP22. This overshoot results in a disturbing cross-regulation.

Since the current through the transformed leakage inductance LS22 corresponds to the current i in the input resonant circuit at the instant t0, it is determined by the power consumption of the voltage converter and its dimensioning. The dependence of the voltage overshoot on the elements of the voltage converter in the form described could lead to the expedient of increasing the value of the parallel capacitance CP or reducing the leakage inductance LS2. However, a reduction of the voltage overshoot is not achieved thereby because an increase of the parallel capacitance CP directly involves an increase of the current i at the instant t0. Moreover, narrow limits, as explained hereinbefore, are imposed on a reduction of the leakage inductance LS2. However, without a reduction of the voltage overshoot, a reduction of the cross-regulation is not possible.

SUMMARY OF THE INVENTION

It is an object of the invention to implement a voltage converter of the type described in the opening paragraph with a plurality of outputs in such a way that an improved synchronous operation of the output voltages, i.e. a reduced cross-regulation, as can be convenietly realized, is achieved.

According to the invention, in a voltage converter of the type described, this object is achieved by a (respective) additional capacitance parallel to the secondary winding of the transformer in the other output circuit(s) comprising the rectifier arrangement(s), the additional capacitance(s) being dimensioned in such a way that its (their) value transformed to the primary side of the transformer (or the transformed sum values) essentially corresponds to the value, transformed to the primary side, of a parallel capacitance of the secondary winding of the transformer of the first output circuit.

In the voltage converter according to the invention, the output circuits may be connected either to different taps of a secondary winding or to secondary windings which are DC-separated for individual output circuits or groups of output circuits. Dependent on the preferred dimensioning of the voltage converter, the parallel capacitance of the first output circuit may be constituted by a parasitic winding capacitance, a separate capacitive component or a combination of both.

Due to the additional capacitance or additional capacitances in at least one of the other output circuits, the current i in the input resonant circuit is distributed by the parallel capacitance to at least a further output circuit, exclusively in the first output circuit. Consequently, the current in the leakage inductance LS2 and LS22 is reduced in the first output circuit at the instant t0. This reduction also outweighs an increase of the current i due to the increase of the capacitive load at the secondary side of the transformer T. Overall, the voltage overshoot is thus reduced without changing the values for the leakage inductance LS22 or the parallel capacitance CP22. Due to the inventive implementation of the voltage converter, the cross-regulation can be reduced by about 30%. This is possible with a very small number of additional components.

In a voltage converter of the type described, this object can also be achieved by means of a (respective) subsidiary circuit in the other output circuit(s) comprising the rectifier arrangement(s). Each subsidiary circuit now includes an additional secondary winding of the transformer, arranged with an additional capacitor and an additional rectifier arrangement in a series circuit, and this series circuit is arranged parallel to a branch of the rectifier arrangement of the relevant output circuit as well as to a load connected thereto.

Due to this inventive implementation of the voltage converter, it is possible to force the current through the leakage inductance, at the secondary side, of the first secondary winding (high-voltage winding) of the transformer to zero at the start of the voltage overshoot (cf. instant t0 in FIG. 4). Since the voltage overshoot is proportional to this current, it can also be rendered zero. The cross-regulation can thereby be eliminated at least substantially. To achieve this, a respective subsidiary circuit is assigned to at least one of the other output circuits of the voltage converter, constituting, with its additional secondary winding of the transformer and its additional capacitor, a circuitry which is capable of resonance. This circuitry is connected via an additional rectifier arrangement to the rectifier arrangement of the associated output circuit and the load connected thereto, such that a current occurs in the additional secondary winding of the transformer at the start of the voltage overshoot, which current will compete with the current through the leakage inductance of the secondary winding of the output circuit. By corresponding dimensioning of the additional secondary winding and the additional capacitor of the subsidiary circuit (or the subsidiary circuits, in so far as more output circuits are present and a plurality of them is provided each with a subsidiary circuit), it can be achieved that the current in the leakage inductance, at the secondary side, of the secondary winding of the output circuit becomes zero at the start of the voltage overshoot. Consequently, the voltage overshoot and hence also the cross-regulation caused thereby is at least substantially completely eliminated. The additional rectifier arrangement causes a current to flow in the subsidiary circuit only in the time-proximity of the start of the voltage overshoot. For this purpose, the series circuit in the subsidiary circuit comprises an additional secondary winding, an additional capacitor and an additional rectifier arrangement parallel to a branch of the rectifier arrangement of the relevant output circuit and the load connected thereto. By comparing the voltage at this load with the voltage occurring in the subsidiary circuit, it is ensured that the flow of current in the subsidiary circuit occurs at the start of the voltage overshoot.

Preferably, a tuning resistor may be arranged parallel to or in series with the additional capacitor in the subsidiary circuit, with which resistor the amplitude of the current in the subsidiary circuit can be tuned to a value with which a possibly complete elimination of the cross-regulation is achieved.

According to the invention, cross-regulation can be at least substantially excluded by using a slightly larger number of components.

In an advantageous implementation of this voltage converter according to the invention, the additional rectifier arrangement or additional rectifier arrangements is/are implemented as bridge rectifiers. Such a bridge rectifier, preferably operating in the same way as the rectifier arrangement of the associated output circuit, is connected to its load.

In a further embodiment of the voltage converter according to the invention, the rectifier arrangement(s) of the output circuit (or output circuits) is (are) implemented as bridge rectifiers. A part of the elements of the bridge rectifier of an output circuit is also a part of the additional rectifier arrangement of the same output circuit.

Voltage converters of the type according to the invention can be advantageously used in electrical apparatuses of all kinds in which a plurality of loads are supplied from an energy source, with one of the loads to be supplied with a higher electric voltage as compared with the other loads. The voltage converter according to the invention is particularly suitable for use in mains-powered apparatuses such as monitors, television receivers or the like.

BRIEF DESCRIPTION OF THE DRAWING

Further embodiments of the invention are shown in FIGS. 7 to 10 and will be described hereinafter. Elements already described have the same reference symbols.

Figure 7:
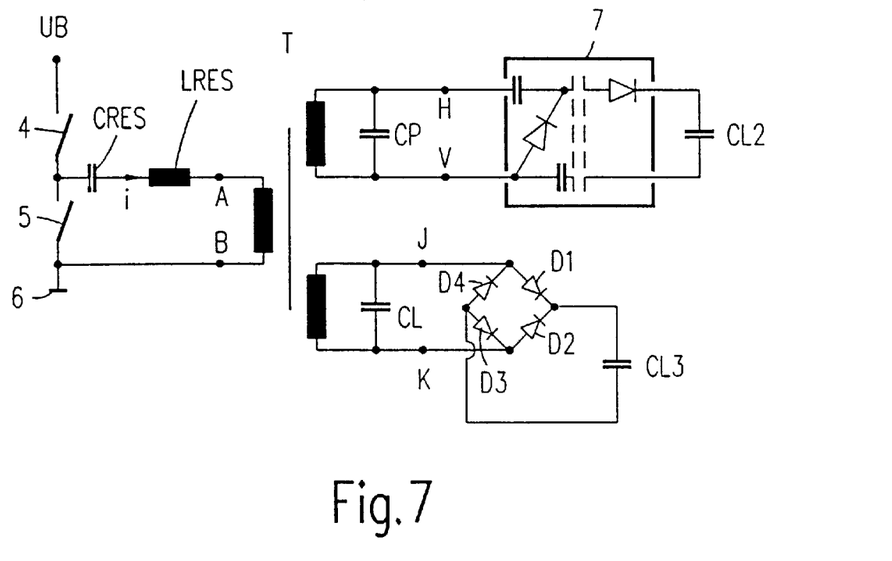
FIG. 7 is a circuit diagram of a first embodiment of a voltage converter according to the invention.

FIG. 7 shows a circuit arrangement for a voltage converter which substantially corresponds to the circuit arrangement shown in FIG. 1. In so far, reference is made to the description of FIG. 1.

As compared with the circuit arrangement of FIG. 1, the embodiment of FIG. 7 includes an additional capacitance CL which is arranged parallel to the secondary winding between the junction points J and K in the output circuit connected to the second secondary winding of the transformer T. This additional capacitance CL is dimensioned in such a way that its capacitance transformed by way of the transformation ratio between the second secondary winding (low-voltage winding) and the primary winding of the transformer T to its primary side is equally large as the capacitance of the parallel capacitance CP in the first output circuit between the junction points H and V, transformed by way of the transformation ratio between the first secondary winding (high-voltage winding) and the primary winding of the transformer T. The current i in the input resonant circuit is then at least substantially uniformly distributed in the two output circuits. The voltage overshoot is thereby reduced by approximately 30%.

Figure 8:
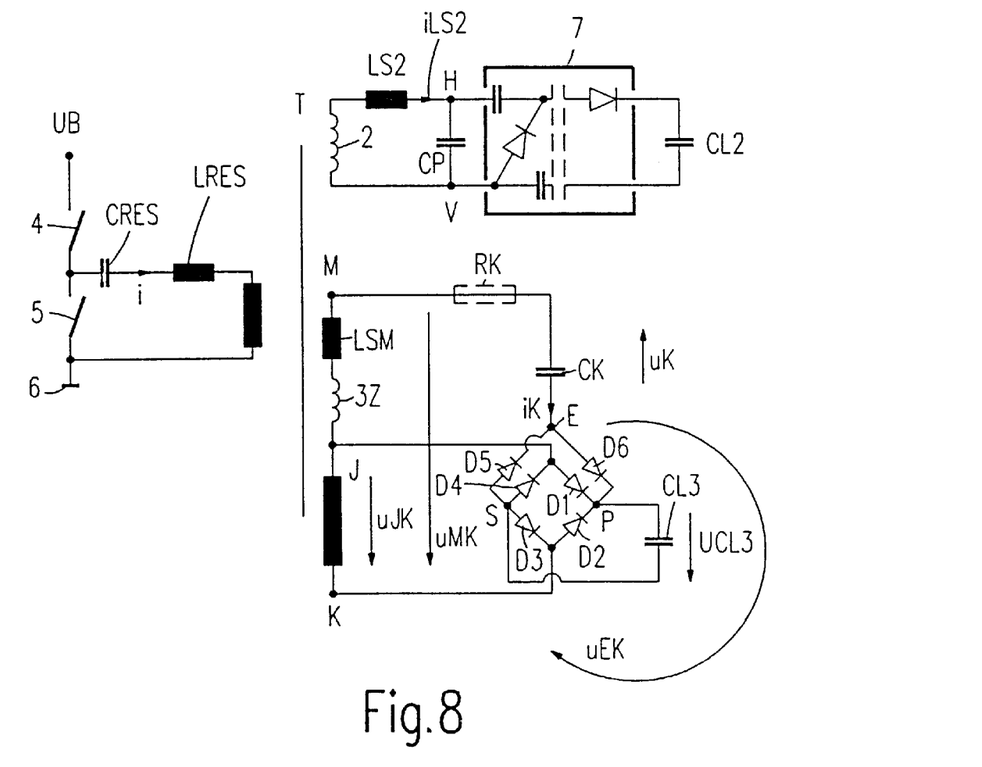
FIG. 8 is a circuit diagram of a second embodiment of a voltage converter according to the invention.

FIG. 8 shows a second embodiment for a voltage converter according to the invention which is also similar to the voltage converter of FIG. 1. As compared with FIG. 1, the circuit arrangement of FIG. 8 has a subsidiary circuit assigned to the output circuit connected to the second secondary winding. This subsidiary circuit has an additional secondary winding which is also associated with the core of the transformer T and has one side connected to the junction point J. The second terminal of this additional secondary winding constitutes a further junction point M. The further junction point M is connected via an additional capacitor CK and possibly a tuning resistor RK arranged in series therewith to a junction point E which constitutes a connection point for an additional rectifier arrangement. This additional rectifier arrangement comprises the diodes D2 and D3 of the rectifier arrangement of the output circuit, as well as two further diodes D5 and D6 and, similarly to the rectifier arrangement of the output circuit, is implemented as a bridge rectifier. The junction points E and K then constitute AC voltage-input terminals of the additional rectifier arrangement. The junction points J and K constitute AC voltage-input terminals of the rectifier arrangement D1, D2, D3, D4 of the output circuit, and the load capacitance CL3 of this output circuit, from which the further DC power supply voltage U can be taken, is connected to junction points P and S which constitute the DC output terminals of the additional rectifier arrangement D2, D3, D5, D6 as well as the rectifier arrangement D1, D2, D3, D4 of the output circuit. The diode D1 is arranged between the junction points J and P, D2 is arranged between P and K, D3 is arranged between K and S, D4 is arranged between S and J, D5 is arranged between S and E, and D6 is arranged between E and P. D2 and D3 are thus elements of the rectifier arrangement of the output circuit as well as the additional rectifier arrangement.

In FIG. 8, the reference LSM denotes the leakage inductance of the additional secondary winding between the junction points M and J; the reference 3Z denotes the ideal additional secondary winding of the transformer T in the equivalent circuit diagram of FIG. 8, which transformer is arranged in series with the leakage inductance LSM between the junction points M and J. In a corresponding manner, an equivalent circuit diagram representation is chosen for the first secondary winding 2 and its leakage inductance LS2 in FIG. 8.

Figure 9:
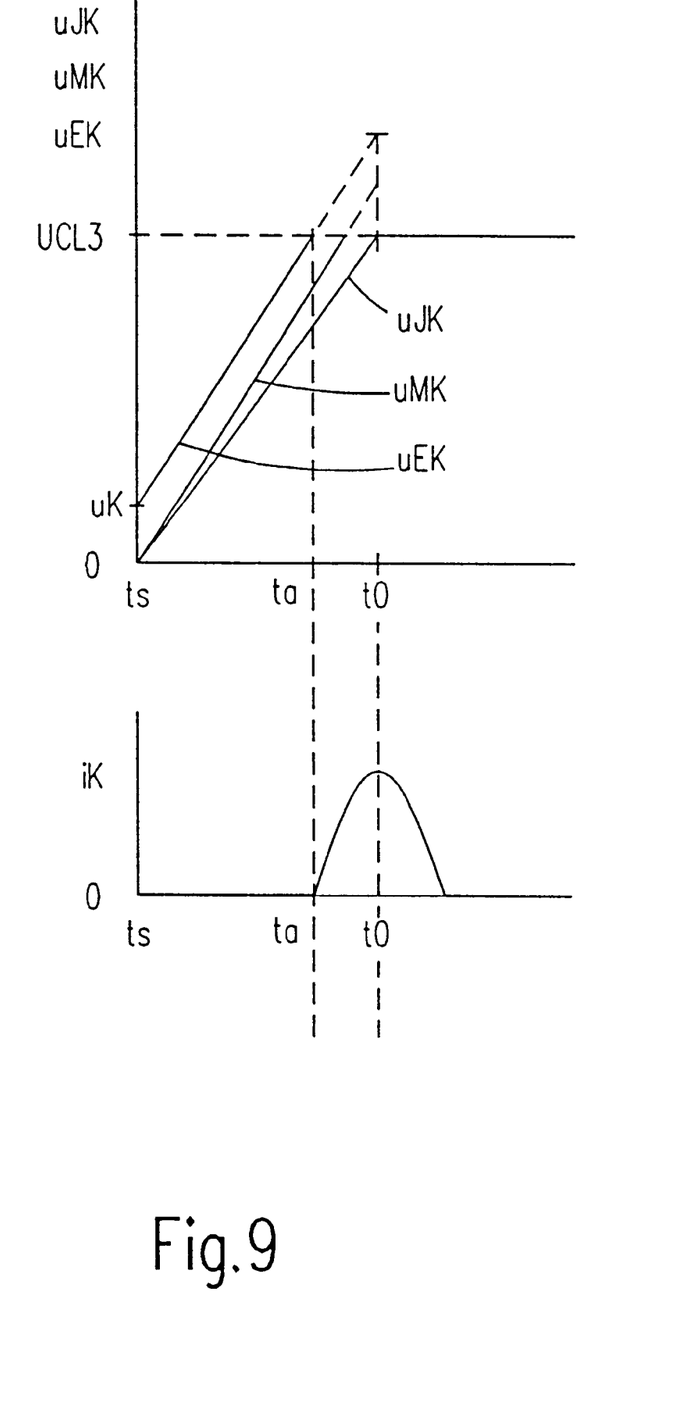
FIG. 9 shows current and voltage characteristic curves in the embodiment shown in FIG. 8.

To show the functioning of the embodiment in FIG. 8, reference is made to FIG. 9. In the transient state of the circuit arrangement shown in FIG. 8, a DC voltage uK is formed at the terminals of the additional capacitor CK at the instant ts already shown in FIG. 4, which DC voltage is approximately equal to the peak value of the voltage across the additional secondary winding between the junction points M and J and has a polarity which increases the current value of the voltage uMK between the junction points M and K. The polarity of the voltage uK at the additional capacitor CK is determined by the current which has passed through this additional capacitor CK in the preceding half cycle of the current i in the input resonant circuit, or the voltage uAB. The upper part of FIG. 9 shows the variation of the voltage uMK for the start of a half wave in which the potential at the junction point M, as compared with the potential at the junction point K, increases constantly. The reference uJK denotes the voltage between the junction points J and K, i.e. the voltage being formed at the secondary winding of the output circuit. As compared with this voltage, the voltage uMK is increased proportionally by the ratio of the number of turns between the junction points M and K, on the one hand, and the junction points J and K, on the other hand. The voltage uEK between the junction points E and K, composed of the sum of the voltages uK and uMK, is shifted by the DC voltage uK as compared with the variation of the voltage uMK.

The voltage uEK rises with the voltage uMK until it reaches, at an instant ta, the value of the further DC power supply voltage UCL3 at the load capacitance CL3. By transformation to the primary side of the transformer T by means of the associated transformation ratio, the voltage UCL3 becomes the voltage U already described. While ignoring the diode forward voltages of the diodes D3 and D6, a current iK through the additional capacitor CK and hence through the subsidiary circuit starts at the instant ta, which current constitutes an oscillation whose period is determined by the leakage inductance LSM of the additional secondary winding as well as by the additional capacitor CK. The amplitude of this oscillation is also determined by the value which the voltage uEK would reach when its variation before the instant ta to the instant t0 is extrapolated. The instant t0 is identical to the start of the voltage overshoot shown in FIG. 4. The current iK through the additional capacitor CK is shown in the lower part of FIG. 9 and constitutes a waveform with a semi-sinusoidal variation whose maximum occurs after a quarter of the period of said oscillation, counted from instant ta onwards.

With a corresponding of choice of dimensioning the additional secondary winding and its leakage inductance LSM as well as the additional capacitor CK, it can now be achieved that the semi-sinusoidal wave of the described oscillation extends through a time interval which includes the instant t0, i.e. the start of the voltage overshoot. As induced by the current i in the input resonant circuit, a current not only flows in the first secondary winding (high-voltage winding) of the transformer T, shown as iLS2 in FIG. 8, but also the current iK flows in the additional secondary winding and the additional capacitor CK at this instant t0. At the instant t0, there is thus a competition between the current paths for the currents iLS2 and iK. By appropriate implementation and choice of the additional secondary winding between the junction points M and J, the leakage inductance LSM and the capacitor CK, it can be achieved that the current iLS2 through the leakage inductance LS2 at the secondary side disappears at the instant t0. Preferably, this dimensioning is realized in such a way that the current iK assumes its maximum value at the instant t0, so that the time interval between the instants t0 and ta exactly corresponds to one quarter of the period of the oscillation through the subsidiary circuit. At this dimensioning, a tuning resistor RK for fine tuning may be arranged in series with the additional capacitor CK. This tuning resistor RK is shown in broken lines in FIG. 8 and may optionally be arranged parallel to the additional capacitor CK.

With this dimensioning, with which the current iLS2 and hence the current flowing through the transformed leakage inductance LS22 and derived by transformation to the primary side of the transformer T disappear at the instant t0 in the equivalent circuit diagram of FIG. 3, the voltage overshoot which is proportional to said currents, may also be rendered zero. The cross-regulation triggered by the voltage overshoot can thereby be eliminated.

Figure 10:
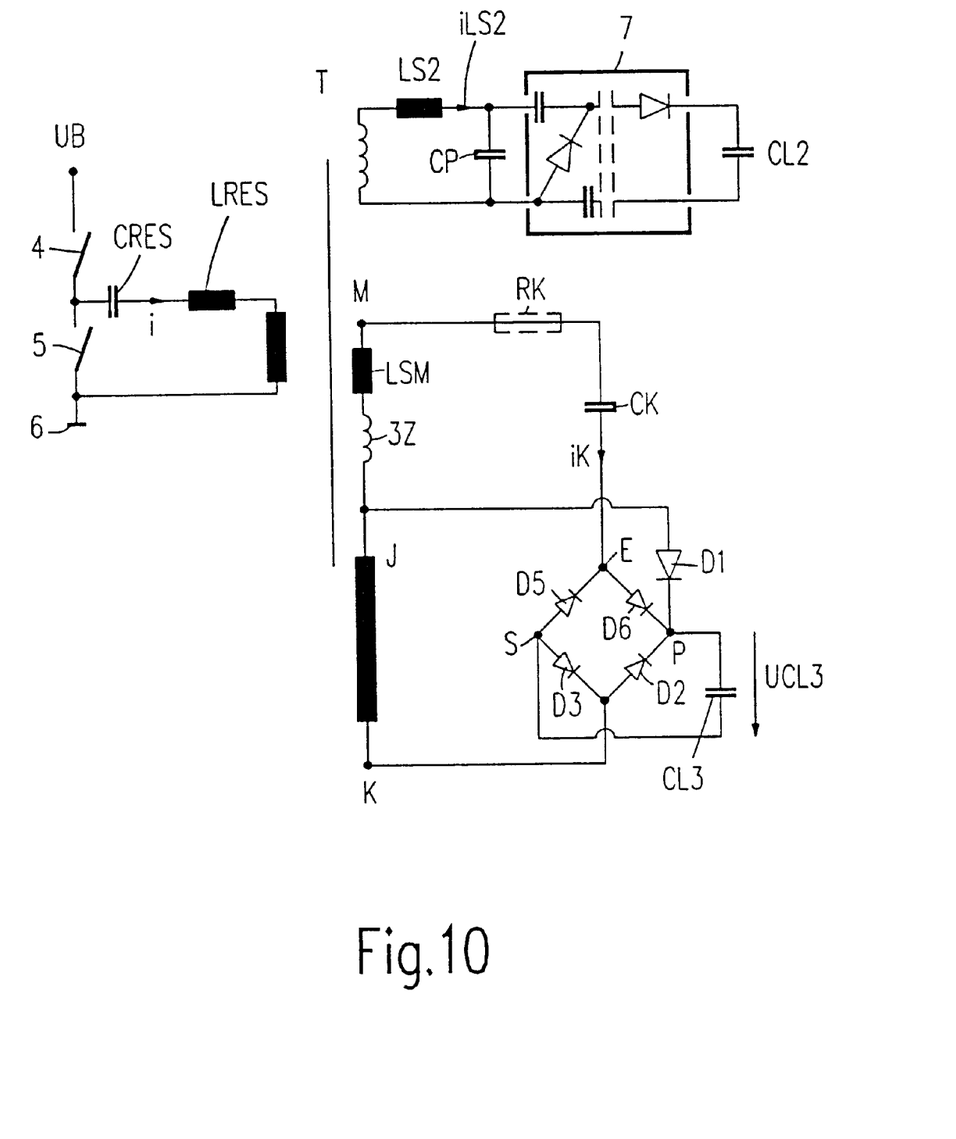
FIG. 10 shows a variant of the second embodiment of FIG. 8.

FIG. 10 shows a further embodiment of the invention obtained as a variant of the circuit arrangement shown in FIG. 8. As compared with FIG. 8, the diode D4 is omitted in FIG. 10 and the diode D1 constitutes, without the subsidiary circuit, a half-wave rectifier for the AC voltage supplied by the junction points J and K so as to form the DC voltage UCL3 via the load capacitance CL3. The subsidiary circuit for this arrangement, comprising the additional secondary winding between the junction points M and J, the additional capacitor CK and the additional bridge rectifier consisting of the diodes D2, D3, D5 and D6, as well as the tuning resistor RK, if any, is identical to the subsidiary circuit shown in FIG. 8.

The embodiments shown in FIGS. 8 and 10 may be extended with further secondary windings and output circuits connected thereto, which output circuits may be optionally provided with further subsidiary circuits.

The invention leads to a significant improvement of the synchronism between the output voltages of the output circuits in the voltage converter. Consequently voltage converters of this type may be used in a wide field of application for apparatuses in which strict requirements are imposed on synchronous operation, for example, monitors and television receivers.

I claim:

1. A voltage converter for converting an input voltage into at least two output voltages, comprising:

an input resonant circuit which includes a primary winding of a transformer and which receives the input voltage applied in periodically recurrent time intervals, at least first and second output circuits, each of which includes a secondary winding or a part of a secondary winding of the transformer and from which respective first and second output voltages can be derived, the first output circuit having a parallel capacitance of the secondary winding, the first output voltage supplied by the first output circuit constituting a high voltage and the second output voltage constituting a lower voltage with respect to said high voltage, the second output circuit comprising a rectifier arrangement for supplying a DC output voltage, an additional capacitance parallel to the secondary winding of the transformer in the second output circuit, the additional capacitance being dimensioned such that its value transformed to the primary side of the transformer essentially corresponds to the value, transformed to the primary side, of the parallel capacitance of the transformer secondary winding in the first output circuit.

2. A voltage converter for converting an input voltage into at least two output voltages, comprising:

an input resonant circuit which includes a primary winding of a transformer and which receives the input voltage applied in periodically recurrent time intervals, at least first and second output circuits, each of which includes a secondary winding or a part of a secondary winding of the transformer and from which respective first and second output voltages can be derived, the first output voltage supplied by the first output circuit constituting a high voltage and the second output voltage constituting a lower voltage with respect to said high voltage, the second output circuit comprising a rectifier arrangement for supplying a DC output voltage, a subsidiary circuit in the second output circuit comprising an additional secondary winding of the transformer, an additional capacitor and an additional rectifier arrangement connected in a series circuit, and wherein said series circuit is parallel to a branch of the rectifier arrangement of the second output circuit as well as to a load connected thereto.

3. A voltage converter as claimed in claim 2, wherein the additional rectifier arrangement comprises a bridge rectifier.

4. A voltage converter as claimed in claim 2 further comprising a tuning resistor coupled to said series circuit and having a resistance of a value to further improve any cross-regulation of the first and second output circuits.

5. A voltage converter as claimed in claim 1 wherein the first output circuit further comprises a rectifier and a load capacitor coupled to the high voltage secondary winding of the transformer, and said parallel capacitance of the transformer secondary winding in the first output circuit is connected across said high voltage secondary winding before said rectifier and load capacitor.

6. A voltage converter as claimed in claim 5 wherein said parallel capacitance in the first output circuit comprises a combination of a discrete capacitor and the parasitic winding capacitance of the high voltage secondary winding of the transformer.

7. A voltage converter comprising:

at least one switching transistor coupled to an input terminal which supplies an input voltage to be converted into a first high output voltage and a second output voltage lower than the first output voltage, an input resonant circuit coupled to the at least one switching transistor and which includes a primary winding of a transformer, at least first and second output circuits comprising respective first and second secondary winding means of said transformer and respective first and second output terminals at which said first and second output voltages, respectively, are derived, a first capacitance in parallel with the first secondary winding means, a second capacitance in parallel with the second secondary winding means, a rectifier arrangement coupled between the second secondary winding means and the second output terminal, and wherein the capacitance value of the second capacitance transformed to the primary winding side of the transformer corresponds approximately to the capacitance value of the first capacitance transformed to the primary winding side of the transformer.

8. The voltage converter as claimed in claim 7 wherein the input resonant circuit includes a further capacitor and an inductor connected in series circuit with the primary winding across said at least one switching transistor, and said first and second secondary winding means comprise first and second electrically separated secondary windings of the transformer.

9. The voltage converter as claimed in claim 7 wherein the input resonant circuit includes a further capacitor and an inductor connected in series circuit with the primary winding across said at least one switching transistor, and said first and second secondary winding means comprise first and second parts of a single secondary winding of the transformer.

10. The voltage converter as claimed in claim 7 wherein the first output circuit includes a rectifier coupled between the first winding means and the first output terminal and a first load capacitor coupled to the first output terminal, and the second output circuit includes a second load capacitor coupled to the second output terminal.

11. The voltage converter as claimed in claim 7 wherein the transformed capacitance value of the second capacitance is essentially equal to the transformed capacitance value of the first capacitance.

12. A voltage converter comprising:

at least one switching transistor coupled to an input terminal which supplies an input voltage to be converted into a first high output voltage and a second output voltage lower than the first output voltage, an input resonant circuit coupled to the at least one switching transistor and which includes a primary winding of a transformer, at least first and second output circuits comprising respective first and second secondary winding means of said transformer and respective first and second output terminals at which said first and second output voltages, respectively, are derived, a first capacitance in parallel with the first secondary winding means, a first rectifier arrangement coupled between the second secondary winding means and the second output terminal, the second output circuit including a further capacitor, a further secondary winding of the transformer and a second rectifier arrangement connected in a series circuit which is connected to the second secondary winding means and to the second output terminal.

13. The voltage converter as claimed in claim 12 wherein the first rectifier arrangement comprises a first bridge rectifier and the second rectifier arrangement comprises a second bridge rectifier including first and second diodes in parallel with a branch of the first bridge rectifier whereby two diodes of the first bridge rectifier serve as a branch of the second bridge rectifier.

14. The voltage converter as claimed in claim 12 wherein the first rectifier arrangement comprises a half wave rectifier coupled between a terminal of the second secondary winding means and the second output terminal and the second rectifier arrangement comprises a bridge rectifier, and said series circuit is in parallel with the second secondary winding means.

15. The voltage converter as claimed in claim 12 wherein the first rectifier arrangement comprises a first bridge rectifier having first and second input terminals coupled to first and second terminals, respectively, of the second secondary winding means, and the second rectifier arrangement comprises a second bridge rectifier having first and second input terminals coupled to the first terminal of the second secondary winding means and to a first terminal of the further secondary winding of the transformer via said further capacitor.

16. The voltage converter as claimed in claim 12 wherein said first and second secondary winding means comprise first and second electrically separated secondary windings of the transformer.

17. The voltage converter as claimed in claim 12 wherein said first and second secondary winding means comprise first and second parts of a single secondary winding of the transformer.

18. The voltage converter as claimed in claim 12 wherein the further secondary winding and the further capacitor form a resonant circuit, and said further capacitor, said further secondary winding and said second rectifier arrangement form a subsidiary circuit that substantially suppresses a periodic voltage overshoot in the first output circuit that otherwise occurs in the absence of said subsidiary circuit.

19. The voltage converter as claimed in claim 12 wherein the input resonant circuit includes a resonant capacitor and a resonant inductor connected in a second series circuit with the primary winding across said at least one switching transistor, and the first series circuit is parallel to a branch of the first rectifier arrangement and to a load connected to the second output terminal.

20. The voltage converter as claimed in claim 12 further comprising first and second load capacitors connected to said first and second output terminals, respectively.

* * * * *